3,429,885
PYRIDYLETHYL AND PIPERIDYLETHYL PYRROLES
John L. Archibald, Malvern, Pa., assignor to American Home Products Corporation, New York, N.Y., a corporation of New York
No Drawing. Filed Oct. 22, 1965, Ser. No. 502,276
U.S. Cl. 260—294.3   14 Claims
Int. Cl. A61k 27/00; C07d 57/00

ABSTRACT OF THE DISCLOSURE

The compounds are 5-pyridylethyl and 5-piperidylethyl pyrroles, which may be further substituted in the 1 to 4 positions, and their acid-additional salts, which are useful as hypotensive and anti-tremor agents. The compounds may be prepared by direct C-pyridylethyl- or C-piperidyl-ethylethylation of a suitable pyrrole with a 2- or 4-vinyl pyridine or piperidine compound in an acid medium, under an inert atmosphere.

---

This invention relates to new and useful chemical compounds that are derivatives of pyrroles, and, more particularly, to pyridylethyl and piperidylethyl pyrroles and their salts, and to methods for producing them.

The novel compounds encompassed by the invention in the form of their free bases, may be represented by the following general formula:

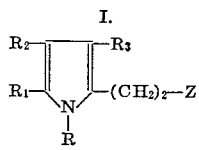

wherein R is selected from the group consisting of hydrogen, alkyl, aralkyl, and dialkylaminoalkyl; $R_1$ is selected from the group consisting of alkyl, dialkylaminoalkyl, alkoxycarbonyl, carboxyalkyl, acyl and aroyl; $R_2$ and $R_3$ are each from the group consisting of hydrogen, alkyl, dialkylaminoalkyl, alkoxycarbonyl, carboxyalkyl, acyl and aroyl; the moiety Z may be 2- or 4-pyridyl, wherein the pyridyl ring may be further optionally substituted with alkyl; or Z may be the corresponding 2- or 4-piperidyl compound which may or may not be further substituted on the nitrogen atom by alkyl, aralkyl, or indolylalkyl.

It has been discovered that compounds meeting the described qualifications, whether as free bases or the acid-addition salts thereof, have useful pharmacological properties. More specifically, said compounds have been found to exhibit utility as central nervous system activators, particularly as hypotensive and anti-tremor agents.

The compounds in which Z is a pyridyl moiety may generally be prepared from suitable pyrroles having an unsubstituted α-position, or from pyrrole-α-carboxylic acids, by a novel reaction comprising heating with 2- or 4-vinyl pyridines in acid media, under an inert atmosphere, wherein C-pyridylethylation of said pyrrole derivatives selectively at the 5-position unexpectedly occurs instead of the known N-pyridylethylation thereof. Where Z is a piperidyl moiety, the compounds may be prepared by reduction of the corresponding pyridyl derivatives, which may or may not be further substituted at the piperidyl nitrogen atom. To obtain the compounds of the invention wherein R is other than hydrogen, the proper 1-substituted pyrrole derivative is selected as a starting material. Alternatively, a pyrrole unsubstituted in the 1-position may be employed, and the desired substituent added by later reaction with sodium hydride followed by treatment with the appropriate halide. Regardless of the method of preparation used, the resultant products may be recovered by standard procedures known to the art.

As indicated hereinbefore, compounds falling within the general Formula I above may be used in the form of their acid-addition salts, while still retaining their effectiveness with respect to hypotensive and anti-tremor activity. The salts may provide greater flexibility in therapeutic use since they may impart various degrees of water-solubility to an otherwise substantially insoluble base. With regard to the acid-addition salts, either organic or inorganic acids may be used for preparing them as long as said acids do not substantially increase the toxicity of the compound. Among the various pharmaceutically-acceptable acid-addition salts considered useful for the purposes indicated are, for example, the hydrochlorides, sulphates, phosphates, hydrobromides, acetates, tartrates, propionates, sulfonates, and the like.

The acid-addition salts may be prepared by procedures now well known to those skilled in the art. For example, a selected novel free base may generally be dissolved in a suitable solvent and the selected acid may then be added thereto. Since the preparation of acid-addition salts is so well known, it need not be described in any greater detail here.

When the compounds of this invention are employed for their hypotensive or anti-tremor activity, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make them suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects, and preferably at a level that is in the range of from about 5 mg. to about 300 mg. per kg. of body weight per day, although as aforementioned variations will occur. However, a dosage level that is in the range of from about 10 mg. to about 125 mg. per kg. of body weight per day is most desirably employed in order to achieve effective results.

The following examples are given by way of illustration and are not to be construed as limitations of this invention, many variations of which are possible without departing from the scope and spirit thereof.

EXAMPLE I

2,4-dimethyl-5-[2-(4-pyridyl)ethyl]pyrrole-3-carboxylic acid, ethyl ester 2,4-dimethyl-3-carbethoxypyrrole (1.67 g.), 4-vinylpyridine (1.07 g.) and acetic acid (10 ml.) were mixed under nitrogen and refluxed for 5 hr. Volatile components were removed in vacuo and the residue was crystallized from ether (decanting from some dark gum). Recrystallization from aqueous ethanol gave the product as colorless needles (950 mg.), M.P. 151–2°.

*Analysis.*—Calcd. for $C_{16}H_{20}N_2O_2$: C, 70.56; H, 7.40; N, 10.29%. Found: C, 70.42; H, 7.44; N, 10.58%.

EXAMPLE II

2,4-dimethyl-3-acetyl-5-[2-(4-pyridyl)ethyl]pyrrole

A mixture of 2,4-dimethyl-3-acetylpyrrole-5-carboxylic acid (9.05 g.), 4-vinylpyridine (5.3 g.) and acetic acid (50 ml.) was refluxed under nitrogen for 90 minutes. Volatile components were removed at 100°/0.1 mm. and the residual oil was crystallized from ethanol-water to give colorless prisms (5.8 g.), M.P. 130–132°. Recrystallization from the same solvents provided the product as a hemihydrate, M.P. 133–4°.

*Analysis.*—Calcd. for $C_{15}H_{18}N_2O \cdot \frac{1}{2}H_2O$: C, 71.68; H, 7.62; N, 11.15. Found: C, 72.35; H, 7.62; N, 11.10. Percent $H_2O$ calcd: 3.58. Found: 3.44.

EXAMPLE III

2,4-dimethyl-5-[2-(4-pyridyl)ethyl]pyrrole-3-propionic acid 2,4-dimethyl-5-carboxypyrrole-3-propionic acid, diethyl ester (10.0 g.) was hydrolysed by heating on a steam bath with water (50 ml.), ethanol (15 ml.) and sodium hydroxide (10 g.) for 3 hr. After boiling off the ethanol, then cooling, the solution was acidified with sulfur dioxide and extracted with ether. The washed and dried ether solution was evaporated under reduced pressure and the resulting diacid was used directly as follows. The diacid and 4-vinylpyridine (4 ml.) were dissolved in acetic acid (25 ml.) under nitrogen and heated on a steam bath for 1 hr. Acetic acid was removed in vacuo and the residual dark, light-sensitive oil was triturated with water. After several hours, the orange precipitate was collected and recrystallized from aqueous ethanol to give orange needles (3.2 g.), M.P. 164–7°. Two further recrystallizations gave the product as orange needles M.P. 167–168°, very sensitive to air and light.

*Analysis.*—Calcd. for $C_{16}H_{20}N_2O_2$: C, 70.56; H, 7.40; N, 10.29%. Found: C, 70.73; H, 7.55; N, 10.05%.

EXAMPLE IV

2,4-dimethyl-5-[2-(4-pyridyl)ethyl]pyrrole 2,4-dimethylpyrrole (5 g.), 4-vinylpyridine (5.6 g.) and acetic acid (20 ml.) were mixed under nitrogen and refluxed for 2 hr. Acetic acid was removed in vacuo and the residue was stirred with ice-water and basified with aqueous sodium hydroxide. Precipitated product was collected, washed, dried and recrystallized from n-hexane (decanting from some dark tar) to give pale yellow prisms (8.3 g.), M.P. 79–80°.

Recrystallization from pentane (extraction thimble) gave the light-sensitive product, M.P. 79–80°.

*Analysis.*—Calcd. for $C_{13}H_{16}N_2$: C, 77.96; H, 8.05; N, 13.99%. Found: C, 78.07; H, 8.01; N, 13.97%.

EXAMPLE V

2,4-dimethyl-3-ethyl-5-[2-(4-pyridyl)ethyl]pyrrole 2,4-dimethyl-3-ethylpyrrole (12.3 g.) was reacted in the same way as in Example IV to provide the product as light-sensitive brown prisms (15.0 g.), M.P. 97–8°.

*Analysis.*—Calcd. for $C_{15}H_{20}N_2$: C, 78.90; H, 8.83; N, 12.27%. Found: C, 79.08; H, 9.04; N, 12.02%.

EXAMPLE VI

2,4-dimethyl-5-[2-(4-piperidyl)ethyl]pyrrole-3-carboxylic acid, ethyl ester

The product of Example I (5.4 g.) in water (10 ml.) and ethanol (8 ml.) was made just acid with concentrated hydrochloric acid, and platinum oxide (0.2 g.) was added. The mixture was hydrogenated at an initial pressure of 50 p.s.i. for 6 hrs. After filtering from the catalyst, the ethanol was removed in vacuo and the residue was diluted with water, cooled in an ice-bath and made strongly basic with sodium hydroxide solution (50% W/W). The resultant gummy precipitate was collected and stirred with ether. After decanting from some insoluble material and evaporating the ether, the residue was crystallized from ethyl acetate-n-hexane, giving 3.3 g., M.P. 121–123°. Recrystallization gave colorless prisms of product M.P. 122–3°.

*Analysis.*—Calcd. for $C_{16}H_{26}N_2O_2$: C, 69.03; H, 9.41; N, 10.60%. Found: C, 69.37; H, 9.46; N, 9.83%.

EXAMPLE VII

2,4-dimethyl-3-acetyl-5-[2-(4-piperidyl)ethyl]pyrrole

The product of Example II was reduced in the same way as in Example VI. The crude product crystallized with difficulty from aqueous ethanol. Two recrystallizations gave colorless microneedles M.P. 158–9°.

*Analysis.*—Calcd. for $C_{15}H_{24}N_2O$: C, 72.54; H, 9.74; N, 11.28%. Found: C, 72.79; H, 9.78; N, 11.11%.

EXAMPLE VIII

5[2-(1-phenethyl-4-piperidyl)ethyl]-3-carbethoxy-2,4-dimethylpyrrole

The compound from Example VI (2.78 g.) and sodium carbonate monohydrate (2.75 g.) in isopropanol (15 ml.) were stirred under reflux and phenethyl bromide (1.85 g.) in isopropanol (5 ml.) was added dropwise. Stirring and refluxing were continued for 16 hrs., then the hot mixture was filtered. After evaporating the filtrate, the residue was triturated with ether and filtered from a small amount of insoluble material. The filtrate was cooled in an ice bath and made just acid with ethereal hydrogen chloride. Recrystallization of the resultant precipitate from water provided the product as its hydrochloride salt (2.5 g.) M.P. 189–191°.

*Analysis.*—Calcd. for $C_{24}H_{35}ClN_2O_2$: C, 68.79; H, 8.42; N, 6.69; Cl, 8.46%. Found: C, 68.79; H, 8.53; N, 6.73; Cl, 8.7%.

EXAMPLE IX

5[2-(1-ethyl-4-piperidyl)ethyl]-3-carbethoxy-2,4-dimethylpyrrole, hydrochloride The product of Example VI was treated in accordance with the procedure described in Example VIII, except that an equivalent amount of ethyl bromide was substituted for phenethyl bromide to obtain ultimately the hydrochloride salt of 5[2-(1-ethyl-4-piperidyl)ethyl]-3-carbethoxy-2,4-dimethylpyrrole.

EXAMPLE X

2,4-dimethyl-5-[2-(3-methyl-4-pyridyl)ethyl]pyrrole

The procedure of Example IV is followed, with the exception that an equivalent amount of 3-methyl-4-vinylpyridine is substituted for the 4-vinylpyridine, thereby to obtain 2,4-dimethyl-5-[2-(3-methyl-4-pyridyl)ethyl]pyrrole.

EXAMPLE XI

2,4-dimethyl-5-[2-(2-ethyl-4-pyridyl)ethyl]pyrrole

Again following the procedure of Example IV, but in this instance utilizing an equivalent amount of 2-ethyl-4-vinylpyridine instead of 4-vinylpyridine, the title compound is obtained.

EXAMPLE XII

2,4-dimethyl-3-carbethoxy-5-[2-(1-[2-(3-indolyl)ethyl]-4-piperidyl)ethyl]pyrrole 2,4 - dimethyl - 3 - carbethoxy - 5 - [2 - (4 - piperidyl)-ethyl]pyrrole was alkylated with 3-(2-bromoethyl)indole in the same way as the alkylation described in Example VIII. The hydrochloride of the product was precipitated by making a cold acetone solution of the crude base just acid with hydrogen chloride. Recrystallization from ethanol gave the product as its hydrochloride salt, M.P. 205° (decomp.).

*Analysis.*—Calcd. for $C_{26}H_{36}ClN_3O_2$: C, 68.19; H, 7.92; N, 9.15; Cl, 7.74%. Found: C, 67.99; H, 8.23; N, 8.82; Cl, 7.85%.

EXAMPLE XIII

1,2,4-trimethyl-5-[2-(2-pyridyl)ethyl]pyrrole

Following the procedure of Example IV, but utilizing 1,2,4-trimethylpyrrole instead of 2,4-dimethylpyrrole, and 2-vinylpyridine instead of 4-vinylpyridine; 1,2,4-trimethyl-5-[2-(2-pyridyl)ethyl]pyrrole is obtained.

EXAMPLE XIV

1-(3-diethylaminopropyl)-2,4-dimethyl-5-[2-(4-pyridyl)ethyl]pyrrole

The compound obtained in Example IV is treated with sodium hydride in dimethylformamide followed by diethylaminopropyl chloride, thereby to obtain 1-(3-diethylaminopropyl) - 2,4 - dimethyl-5-(4-pyridyl)ethyl]pyrrole.

EXAMPLE XV

1-phenethyl-2,4-dimethyl-5-[2-(4-pyridyl)ethyl]pyrrole

Following the procedure of Example XIV, but utilizing phenethyl bromide instead of diethylaminopropyl chloride, 1-phenethyl-2,4-dimethyl-5-[2-(4-pyridyl)ethyl]pyrrole is obtained.

Many of the reactants employed in the process of this invention are known compounds which are readily available from commercial sources. Others which are not commercially available can easily be prepared in accordance with standard organic procedures well known to those skilled in the art.

I claim:

1. A compound selected from the group consisting of bases having the formula:

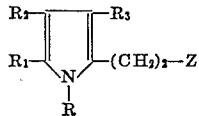

and the pharmaceutically-acceptable acid-addition salts thereof; wherein R is selected from the group consisting of hydrogen, lower alkyl, di(lower)alkylamino(lower)alkyl and phenyl(lower)alkyl; wherein $R_1$ and $R_3$ each represents lower alkyl; $R_2$ is selected from the group consisting of hydrogen, lower alkyl, carbo(lower)alkoxy, carboxy(lower)alkyl and lower alkanoyl; and Z is selected from the group consisting of pyridyl and piperidyl moieties having one of the following structures:

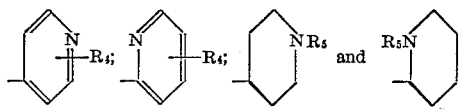

wherein $R_4$ is selected from the group consisting of hydrogen and lower alkyl, and $R_5$ is selected from the group consisting of hydrogen, lower alkyl, phenyl(lower)alkyl and indolyl(lower)alkyl.

2. 2,4-dimethyl-5-[2-(4-pyridyl)ethyl]pyrrole - 3 - carboxylic acid, ethyl ester.

3. 2,4-dimethyl-3-acetyl-5-[2-(4-pyridyl)ethyl]pyrrole.

4. 2,4-dimethyl-5-[2-(4-pyridyl)ethyl]pyrrole - 3 - propionic acid.

5. 2,4-dimethyl-5-[2-(4-pyridyl)ethyl]pyrrole.

6. 2,4-dimethyl-3-ethyl-5-[2-(4-pyridyl)ethyl]pyrrole.

7. 2,4 - dimethyl-5-[2-(4-piperidyl)ethyl]pyrrole-3-carboxylic acid, ethyl ester.

8. 2,4 - dimethyl - 3 - acetyl-5-[2-(4-piperidyl)ethyl]pyrrole.

9. 5[2-(1-phenylethyl-4-piperidyl)ethyl] - 3 - carbethoxy-2,4-dimethylpyrrole.

10. 2,4 - dimethyl-3-carbethoxy-5-[2-(1-[2-(3-indolyl)ethyl]-4-piperidyl)-ethyl]pyrrole.

11. 2,4 - dimethyl-5-[2-(3-methyl - 4 - pyridyl)ethyl] pyrrole.

12. 2,4-dimethyl-5-[2-(2-ethyl-4-pyridyl)ethyl]pyrrole.

13. A method of pyridylethylation of pyrroles which comprises refluxing, in an acid medium, a pyrrole of the formula:

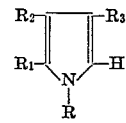

wherein R is selected from the group consisting of hydrogen, lower alkyl, di(lower)alkylamino(lower)alkyl and phen(lower)alkyl; $R_1$ and $R_3$ each represent lower alkyl; and $R_2$ is selected from the group consisting of hydrogen, lower alkyl, carbo(lower)alkoxy, carboxy(lower)alkyl and lower alkanoyl; with a vinylpyridine compound selected from the group which has one of the following structures:

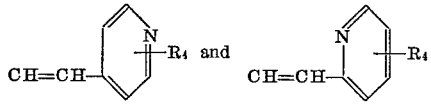

wherein $R_4$ is selected from the group consisting of hydrogen and lower alkyl, and recovering from said medium a C-pyridyl-ethylated pyrrole of the formula:

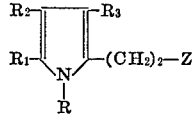

wherein R, $R_1$, $R_2$ and $R_3$ have the same meaning as above, and Z is selected from the pyridyl groups having one of the following structures:

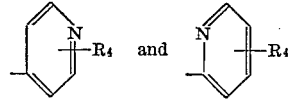

wherein $R_4$ has the same meaning as above.

14. A method of preparing pyrrole derivatives of the formula:

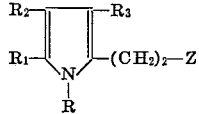

wherein R is selected from the group consisting of hydrogen, lower alkyl, di(lower)alkylamino(lower)alkyl and phen(lower)alkyl; $R_1$ and $R_3$ each represent lower alkyl; $R_2$ is selected from the group consisting of hydrogen, lower alkyl, carbo(lower)alkoxy, carboxy(lower)alkyl and lower alkanoyl; and Z is a piperidyl group selected from those having one of the following structures:

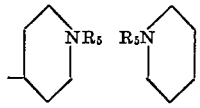

wherein $R_5$ is selected from the group consisting of hydrogen, lower alkyl, phenyl(lower)alkyl and indolylalkyl;

which method comprises the method of pyridylethylation as defined in claim 13, followed by hydrogenation of the resulting pyridylethylated pyrrole derivative to the corresponding piperidylethylated pyrrole derivative, followed by alkylation with an $R_5$ halide.

References Cited

UNITED STATES PATENTS 2,830,057  4/1958  Hoffmann et al. ----- 260—293

OTHER REFERENCES

Berichte, vol. 92, #6, pp. 1363–64, Buchta et al.

HENRY R. JILES, *Primary Examiner.*

E. D. LEWIS, *Assistant Examiner.*

U.S. Cl. X.R.

260—293.2, 295, 296, 293, 294, 294.7, 999